United States Patent
Koh et al.

(10) Patent No.: US 8,507,835 B2
(45) Date of Patent: Aug. 13, 2013

(54) AUTO-FOCUSING METHOD WHICH USES A DIFFERENT FOCUS DETERMINING METHOD ACCORDING TO A TYPE OF CORRESPONDING FOCUS GRAPH, RECORDING MEDIUM RECORDING THE METHOD, AND AUTO-FOCUSING APPARATUS PERFORMING THE METHOD

(75) Inventors: Sung-shik Koh, Seoul (KR); Won-seok Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 12/873,433

(22) Filed: Sep. 1, 2010

(65) Prior Publication Data
US 2011/0068250 A1    Mar. 24, 2011

(30) Foreign Application Priority Data
Sep. 22, 2009   (KR) .................. 10-2009-0089645

(51) Int. Cl.
*G02B 7/04* (2006.01)
*G02B 27/40* (2006.01)
*G02B 27/64* (2006.01)

(52) U.S. Cl.
USPC ............... 250/201.2; 250/201.4; 348/345; 348/208.12

(58) Field of Classification Search
USPC ............. 250/201.2, 201.4; 348/345, E5.045, 348/208.12
See application file for complete search history.

(56) References Cited

U.S. PATENT DOCUMENTS
5,361,095 A * 11/1994 Toshinobu et al. ............ 348/354
* cited by examiner

*Primary Examiner* — Francis M Legasse, Jr.
(74) *Attorney, Agent, or Firm* — Drinker Biddle & Reath LLP

(57) ABSTRACT

An auto-focusing method of creating a focus value when a point light source image and an image having a low contrast are focused, a recording medium recording the method, and an auto-focusing apparatus for performing the method are provided. In an embodiment, point light source reference graphs and non-point light source graphs are previously stored in a database, a reference graph having the most similar pattern to a focus graph is created by comparing the focus graph of input images to the point light source and non-point light source reference graphs, and a focus value is created when an image is focused using a different method according to the type of corresponding reference graph.

22 Claims, 13 Drawing Sheets

POINT LIGHT SOURCE IMAGES ACCORDING TO DISTANCES
(X) (Y) (Z)

AUTO-FOCUSING METHOD WHICH USES A DIFFERENT FOCUS DETERMINING METHOD ACCORDING TO A TYPE OF CORRESPONDING FOCUS GRAPH, RECORDING MEDIUM RECORDING THE METHOD, AND AUTO-FOCUSING APPARATUS PERFORMING THE METHOD

CROSS-REFERENCE TO RELATED PATENT APPLICATIONS

This application claims the benefit of Korean Patent Application No. 10-2009-0089645, filed on Sep. 22, 2009, in the Korean Intellectual Property Office, the disclosure of which is incorporated herein in its entirety by reference.

BACKGROUND

Various embodiments of the invention relate to an auto-focusing method and apparatus.

An auto-focusing function is used to automatically focus an image and obtain a focused image by using a digital photographing apparatus, such as a digital still camera (DSC), a digital single-lens reflex camera (DSLR), a camcorder, etc., before the digital photographing apparatus performs a photographing operation.

A conventional auto-focusing method calculates a focus value with respect to an input image according to the distance between a subject and the digital photographing apparatus, creates a focus graph using the focal value, detects a maximum point on the focus graph, and determines that the maximum point is the focus value that should be used to focus the image. However, when the digital photographing apparatus captures an image having a low contrast among point light source images and non-point light source images by obtaining a focus value based on the conventional method, the captured image is often not focused.

SUMMARY

Various embodiments of the invention provide an auto-focusing method of creating a focus value when a point light source image having a low contrast or a non-point light source image having a low contrast is automatically focused in order to capture a focused image, a recording medium recording the method, and an auto-focusing apparatus for performing the method.

According to an embodiment of the invention, there is provided an auto-focusing method including: creating a focus value of each of input images according to a distance between a lens and a subject and generating a focus graph of the focus values; comparing the focus graph with a point light source reference graph or a non-point light source reference graph; if the focus graph corresponds to the point light source reference graph, determining a minimum point on the focus graph as a focus value of a focused image; and if the focus graph corresponds to the non-point light source reference graph, determining a maximum point on the focus graph as the focus value of the focused image.

The method may further include: normalizing the focus values, wherein the focus graph is generated according to the normalized focus values.

The comparing of the focus graph may include: creating a difference between a sample of the focus graph and a sample of the point light source reference graph or creating a difference between the sample of the focus graph and a sample of the non-point light source reference graph.

The difference may be a deviation or a standard deviation of the samples.

The focus graph may be determined to correspond to the point light source reference graph or the non-point light source reference graph having a small deviation or a small standard deviation.

The point light source reference graph may have a minimum point, and the non-point light source reference graph has a maximum point.

If the focus graph is determined to correspond to the point light source reference graph, the method may include creating exposure information about an input image; comparing the exposure information with reference exposure information; and if the input image has low brightness as a result of the comparison, determining the minimum point on the focus graph as a focus value of a focused image.

The method may further include: if the input image has high brightness as a result of the comparison, determining that creation the focus value of the focused image failed.

The method, if the focus graph is determined to correspond to the non-point light source reference graph, may include creating an acutance of the focus graph; comparing the acutance of the focus graph with a reference acutance; and if the acutance of the focus graph is greater than the reference acutance, determining the maximum value of the focus graph as the focus value of the focused image, and, if the acutance of the focus graph is smaller than the reference acutance, comparing an increase or a reduction in the focus values of the input images according to the distance with a reference; and if the increase or the reduction is smaller than the reference, determining the maximum value of the focus graph as the focus value of the focused image.

The method may further include: if the increase or the reduction is greater than the reference, determining that creation the focus value of the focused image failed.

According to another embodiment of the invention, there is provided a recording medium having recorded thereon the auto-focusing method.

According to another embodiment of the invention, there is provided an auto-focusing apparatus including: a focus value creating unit for creating a focus value of each of input images according to a distance between a lens and a subject and generating a focus graph of the focus values; a focus graph generating unit for comparing the focus graph with a point light source reference graph or a non-point light source reference graph; a first comparison unit for, if the focus graph corresponds to the point light source reference graph, determining a minimum point on the focus graph as a focus value of a focused image; and a first determining unit for, if the focus graph corresponds to the non-point light source reference graph, determining a maximum point on the focus graph as the focus value of the focused image.

The focus graph generating unit may normalize the focus values, and generate the focus graph according to the normalized focus values.

The first comparison unit may create a difference between a sample of the focus graph and a sample of the point light source reference graph or create a difference between the sample of the focus graph and a sample of the non-point light source reference graph.

The difference may be a deviation or a standard deviation of the samples.

The first determining unit may determine that the focus graph corresponds to the point light source reference graph or the non-point light source reference graph having a small deviation or a small standard deviation.

The point light source reference graph may have a minimum point, and the non-point light source reference graph may have a maximum point.

The apparatus may further include: if the first determining unit determines that the focus graph corresponds to the point light source reference graph, a second comparison unit for comparing exposure information about a input image with reference exposure information; and a second determining unit for, if the input image has low brightness as a result of the comparing, determining the minimum point on the focus graph as a focus value of a focused image, and if the input image has high brightness as a result of the comparing, determining that creation of the focus value of the focused image failed.

The apparatus may further include: if the first determining unit determines that the focus graph corresponds to the non-point light source reference graph, a third comparison unit for creating an acutance of the focus graph; a third determining unit for, if the acutance of the focus graph is greater than a reference acutance, determining the maximum value of the focus graph as the focus value of the focused image, and, if the acutance of the focus graph is smaller than the reference acutance, comparing an increase or a reduction in the focus values of the input images according to the distance between the lens and the subject with a reference; a fourth comparison unit for comparing the increase or the reduction with a reference; and a fourth determining unit for, if the increase or the reduction is smaller than the reference, determining the maximum value of the focus graph as the focus value of the focused image, and if the increase or the reduction is greater than the reference, determining that creation of the focus value of the focused image failed.

Another embodiment provides a method for focusing an image, which includes creating a focus graph based on focus values for the image where each focus value corresponds to a distance between a lens and a subject and comparing the focus graph to at least one of a point light source reference graph and a non-point light source reference graph. The method further comprises determining whether the focus graph corresponds to one of the point light source reference graph and the non-point light source reference graph. If the focus graph corresponds to the point light source reference graph, the image is focused based on the minimum point of the focus graph. If the focus graph corresponds to the non-point light source reference graph, the image is focused based on the maximum point of the focus graph.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Hereinafter, the invention will be described in detail by explaining exemplary embodiments of the invention with reference to the attached drawings.

Figure 1:
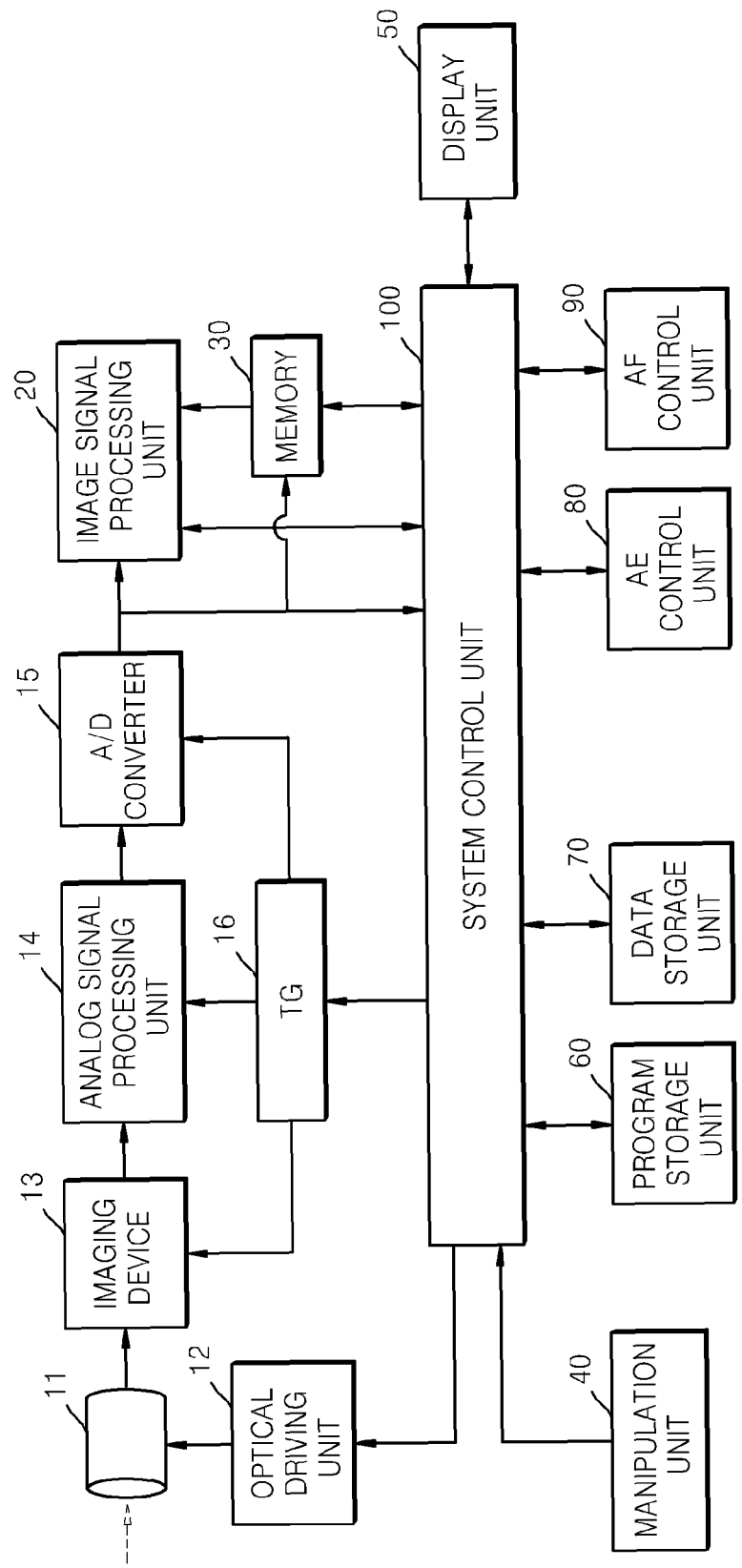
FIG. 1 is a block diagram of a digital photographing apparatus as an example of an auto-focusing apparatus according to an embodiment of the invention.

FIG. 1 is a block diagram of a digital photographing apparatus as an example of an auto-focusing apparatus according to an embodiment of the invention.

In the present embodiment, a digital camera is an example of the digital photographing apparatus. However, embodiments of the invention are not limited to the digital camera and the digital photographing apparatus and may be applied to a digital device in which the digital photographing apparatus is installed, such as a camera phone, a personal digital assistant (PDA), a portable multimedia player (PMP), a television (TV) set, a digital frame, and the like.

Referring to FIG. 1, the digital camera includes an optical unit 11 that receives an optical signal from a subject, an optical driving unit 12 that drives the optical unit 11, an imaging device 13 that converts the optical signal received from the optical unit 11 into an electrical signal, an analog signal processing unit 14 that performs image signal processing, such as noise reduction processing, with respect to the electrical signal, and an analog-to-digital (A/D) converter 15 that converts an analog signal into a digital signal. The digital camera further includes a timing generator (TG) 16 that supplies a timing signal to the imaging device 13, the analog signal processing unit 14, and the A/D converter 15. The digital camera further includes an image signal processing unit 20 that performs image signal processing with respect to image data provided from the A/D converter 15. Although the image data may be input into the image signal processing unit 20 in real time, the image data may be temporarily stored in a memory 30 and supplied to the image signal processing unit 20 if necessary. The digital camera further includes a manipulation unit 40 that inputs a user's manipulation signal, a display unit 50 that displays an image, a program storage unit 60 that stores a program related to an operation of the digital camera, and a data storage unit 70 that stores the image data and predetermined information. The digital camera further includes an automatic exposure (AE) control unit 80 that obtains exposure information about an input image and automatically controls an exposure degree of the input image according to the exposure information. The digital camera further includes an automatic focus (AF) control unit 90 that automatically focuses the input image. The AF control unit 90 will be described in more detail with reference to the accompanying drawings. The digital camera further includes a system control unit 100 that generally controls each element according to the user's manipulation signal or the input image.

In the present embodiment, although each of the elements is realized as a single block, the invention is not limited thereto. At least two of the elements may be realized as a single chip. The elements that perform two or more functions may be realized as two or more chips according to the respective functions.

The above elements will now be described in more detail.

The optical unit 11 may include a lens (not shown) that concentrates the optical signal, an aperture (not shown) that adjusts the quantity (amount of light) of the optical signal, and a shutter (not shown) that controls input of the optical signal. Also, the lens may include a zoom lens that controls a viewing angle to be narrowed or widened according to a focal length and a focus lens that focuses a subject. The zoom and focus lenses may be formed of a respective single lens or a group of a plurality of lenses. The optical unit 11 may include a mechanical shutter having a cover moving up and down. Alternatively, the optical unit 11 may function as a shutter by controlling a supply of an electrical signal to the imaging device 13.

The optical driving unit 12 for driving the optical unit 10 may drive the position of each lens, the opening/closing of the aperture, an operation of the shutter, etc., to perform auto-focusing, AE adjustment, aperture adjustment, zooming, focus changing, etc. The optical driving unit 12 may receive a control signal from the AE control unit 80, the AF control unit 90, or the system control unit 100 to control driving of the optical unit 11. When an image is focused, the AF control unit 90 obtains a focus value of the focused image, obtains a distance between a subject corresponding to the focus value and the digital camera, and determines the position information of the lens corresponding to the distance, thereby driving the lens of the optical unit 11. Thus, when the image is focused, the digital camera obtains the focused image through the optical unit 11.

The imaging device 13 receives the optical signal from the optical unit 11 and forms an image of the subject. The imaging device 13 may use a complementary metal oxide semiconductor (CMOS) sensor array or a charge coupled device (CCD) sensor array. The imaging device 13 may provide image data corresponding to an image of a single frame according to the timing signal supplied from the TG 16.

The analog signal processing unit 14 may include a circuit that performs signal processing to adjust a gain or regulate a waveform with respect to the electrical signal provided by the imaging device 13.

The electrical signal supplied from the analog signal processing unit 14, which is an analog signal, is converted into a digital signal by the A/D converter 15 so that image data including an image of a frame is generated.

The image signal processing unit 20 may reduce noise with respect to input image data and perform image signal processing, such as gamma correction, color filter array interpolation, color matrix, color correction, and color enhancement, etc., in order to improve image quality. The image signal processing unit 20 may generate an image file by compressing the image data generated by performing image signal processing thereon in order to improve image quality, or may restore the image data from the image file. A compression format of the image data may be a reversible format or an irreversible format. Examples of an appropriate compression format may include a joint photographic experts group (JPEG) format and a JPEG 2000 format. The compressed image file may be stored in the data storage unit 70. The image signal processing unit 20 may functionally perform obscurity processing, color processing, blur processing, edge emphasis processing, image interpretation processing, image recognition processing, or image effect processing. The image recognition processing may include face recognition processing or scene recognition processing. In addition, the image signal processing unit 20 may perform processing on a display image signal to be displayed on a display unit 50. For example, brightness level control, color correction, contrast control, edge emphasis control, screen division processing, character image generation, or image synthesis processing may be performed. In an embodiment, the image signal processing unit 20 is connected to an external monitor and may perform predetermined image signal processing on image data to be displayed on the external monitor and transmit the processed image data so that a corresponding image may be displayed on the external monitor.

The image data provided from the A/D converter 15 may be transmitted to the image signal processing unit 20 in real time. However, when a transmitting speed differs from a processing speed of the image signal processing unit 20, the image data may be temporarily stored in the memory 30, and then may be provided to the image signal processing unit 20. A memory device such as a synchronous dynamic random access memory (SDRAM), (multi-chip package) (MCP), or a dynamic random access memory may be used as the memory 30.

The image data signal processed by the image signal processing unit 20 may be stored in the data storage unit 70. The data storage unit 70 may be embedded in or be detachable from the digital photographing apparatus. For example, a secure digital card/multimedia (SDcard/MM), a hard disk drive (HDD), an optical disk, an optical magnetic disk, a hologram memory, etc., may be used as the data storage unit 70.

The image data on which the image signal processing was performed may be transmitted to the display unit 50 and be realized as a predetermined image. The display unit 50 may use a display device, such as a liquid crystal display (LCD), an organic light emitting display (OLED), a plasma display panel (PDP), or an electrophoretic display (EDD).

The program storage unit 60 may store an operating system (OS), an application program, etc., which are needed to operate the digital photographing apparatus. An electrically erasable programmable read only memory (EEPROM), a flash memory, a read only memory (ROM), etc., may be used as the program storage unit 60.

The manipulation unit 40 may include elements for manipulating the digital photographing apparatus or for arranging various settings during a photographing operation. For example, the manipulation unit 40 may include buttons, keys, a touch panel, a touch screen, a dial, etc., and may input user manipulation signals, such as a power on/off, photographing start/stop, replay start/stop/search, optical system driving, mode conversion, menu manipulation, selection manipulation, etc.

Also, the digital photographing apparatus may include the AE control unit 80 that automatically controls exposure of an input image in the present embodiment.

The digital photographing apparatus includes the AF control unit 90 that automatically focuses the input image.

The system control unit 100 may control each element of the digital photographing apparatus according to the application programs stored in the program storage unit 60, or may generally control each element according to a user's manipulation signal input through the manipulation unit 40, the input image, and an image processing result of the image signal processing unit 20.

Figure 2:
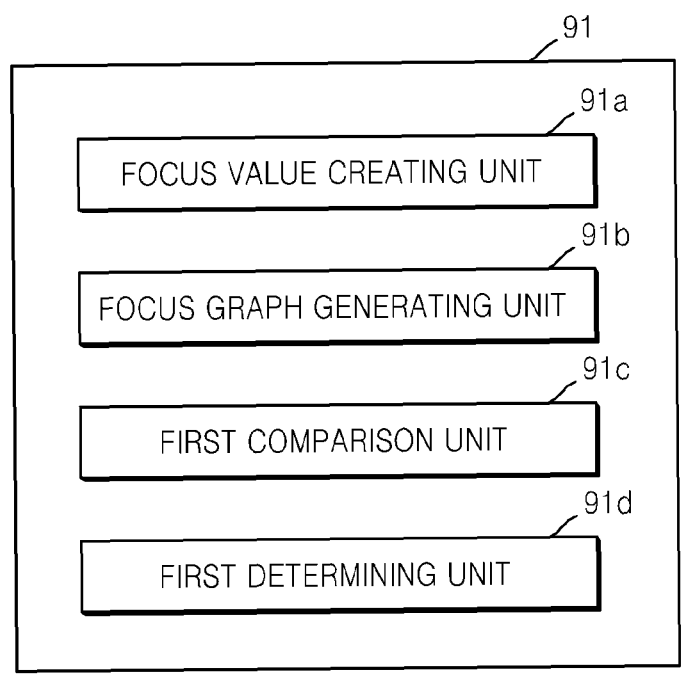
FIG. 2 is a block diagram of an automatic focus (AF) control unit of the digital photographing apparatus of FIG. 1 according to an embodiment of the invention.

FIG. 2 is a block diagram of an AF control unit 91 according to an embodiment of the invention. Referring to FIG. 2, the AF control unit 91 includes a focus value creating unit 91a that creates a focus value of each of input images according to a distance between a lens and a subject, and a focus graph generating unit 91b that creates a focus graph of the focus value according to the distance. The focus value creating unit 91a may read the focus value by a pulse of a vertical synchronous (VD) signal, and increase a parameter corresponding to an increase and a reduction of the number of pulses according to a change in the focus value. The focus graph generating unit 91b may normalize the focus value and generate the focus graph by using the normalized focus value. For example, the focus graph generating unit 91b may normalize the focus value by dividing a difference between a corresponding focus value FV, and a minimum focus value $FV_{min}$ by a maximum focus value $FV_{max}$ and creating a normalized focus value $NnnormFV_i$ as expressed in equation 1 below.

$$NormFV_i = \frac{FV_i - FV_{min}}{FV_{max}},$$ (1)

$(i = 1, 2, 3 \ldots samplecnt)$

The AF control unit 91 further includes a first comparison unit 91c that compares the focus graph with a point light source reference graph or a non-point light source reference graph. The first comparison unit 91c may use a difference between a sample of the focus graph and a sample of the point light source reference graph, or between the sample of the focus graph and a sample of the non-point light source reference graph. The difference may be an average or a standard deviation. The average AveFV no.ref may be created according to equation 2 below, and the standard deviation StdFV no.ref may be created according to equation 3 below. no.ref denotes a number indicating a point light source reference graph or a non-point light source reference graph.

Figure 3:
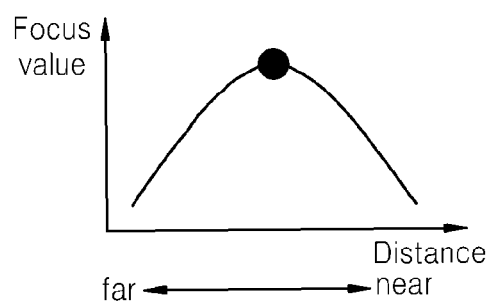
FIGS. 3 through 6 are non-point light source reference graphs.
Figure 4:
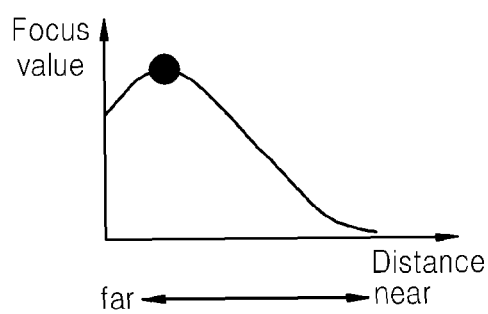
Figure 5:
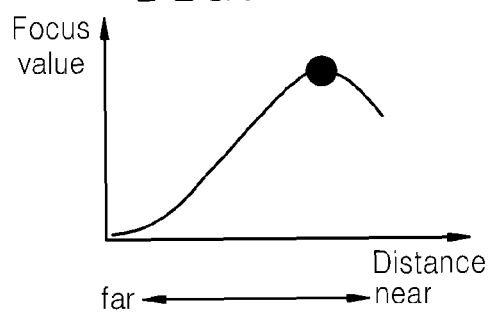
Figure 6:
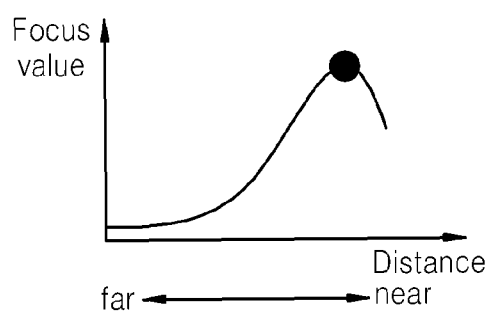
Figure 7:
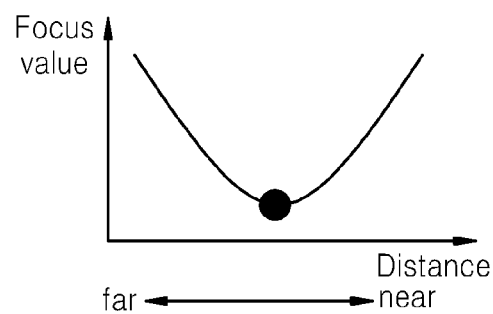
FIGS. 7 and 8 are point light source reference graphs according to embodiments of the invention.
Figure 8:
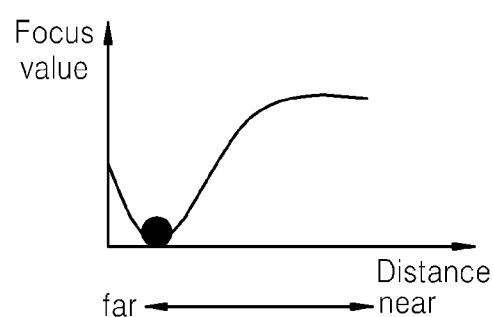

Non-point light source reference graphs shown in FIGS. 3 through 6 and point light source reference graphs shown in FIGS. 7 and 8 may be previously stored. All focus graphs are assumed to have a sine wave form. A non-point light source reference graph has a maximum point and a point light source reference graph has a minimum point. Four non-point light source reference graphs are previously stored in which focus values of a focused image are distributed in a center region (FIG. 3), at a far distance (FIG. 4), and at a near distance (FIGS. 5 and 6). Meanwhile, since a photographing operation is mainly performed at a far distance in a point light source reference graph, two point light source reference graphs are previously stored in which focus values of a focused image are distributed in a center region (FIG. 7) and at a far distance (FIG. 8). Referring to FIGS. 7 and 8, the point light source reference graphs show that an amount of light received by the lens that is closer to the subject is reduced. The point light source reference graphs may be mainly related to a dark mono-color subject. Among the reference graphs shown in FIGS. 3 through 8, if a difference between first reference graph and a focus graph shown in FIG. 3 is created, no.ref may indicate 1. Since six reference graphs are previously stored, no.ref may indicate 1 through 6. The difference is used to create an average according to equation 2 below. Among the reference graphs shown in FIGS. 3 through 8, the average AveFV no.ref may be created by obtaining a difference between a focus value refCurveino.ref of each sample and a normalized focus value NormalFV and dividing a sum of differences of all samples by the number of samples samplcnt.

$$AvgFV^{no.ref} = \left( \sum_{i=1}^{samplecnt} \left| NormFV_i - refCurve_i^{no.ref} \right| \right) / samplecnt,$$ (2)

$(no.ref = 1, 2, 3, 4, 5, 6)$ $(i = 1, 2, 3 \ldots samplecnt)$

The standard deviation StdFV no.ref may be created by squaring a value obtained by subtracting the focus value refCurveino.ref of each sample among the reference graphs shown in FIGS. 3 through 8 and the average AveFV no.ref from the normalized focus value NormalFV and dividing the squared value by the number of samples samplcnt as expressed in equation 3 below.

$$StdFV^{no.ref} = ((NormFV_i - refCurve_i^{no.ref}) - AvgFr^{no.ref})^2 / samplecnt$$ (3)

A reference graph having the smallest difference from a focus graph may be created. If the smallest difference is used as a standard deviation, a standard deviation StdFVno.ref between the focus graph and each of reference graphs are created, a minimum standard deviation is detected from the created standard deviations, and a reference graph corresponding to the minimum standard deviation may be determined as having the most similar pattern to the focus graph as expressed in equation 4.

$$StdFV_{min} = Min(StdFV^{no.ref}), (no.ref = 1, 2, 3, 4, 5, 6)$$ (4)

If the focus graph corresponds to a point light source reference graph, i.e., if the focus graph is determined to have the most similar pattern to the point light source reference graph, a first determining unit 91d may determine a minimum point on the focus graph as a focus value of a focused image. If the focus graphs corresponds to a non-point light source reference graph, i.e., if it is determined that the focus graph has the most similar pattern to the non-point light source reference graph, the first determining unit 91d may determine a maximum point on the focus graph as a focus value of the focused image.

Therefore, according to the present embodiment, a pattern of a focus graph and that of a previously stored reference graph are compared to each other, it is determined whether an input image is a point light source image or a non-point light source image, if it is determined that the input image is the point light source image, an appropriate focus value of the focused image is created, and if it is determined that the input image is the non-point light source image, an appropriate focus value of the focused image is created.

Figure 9:
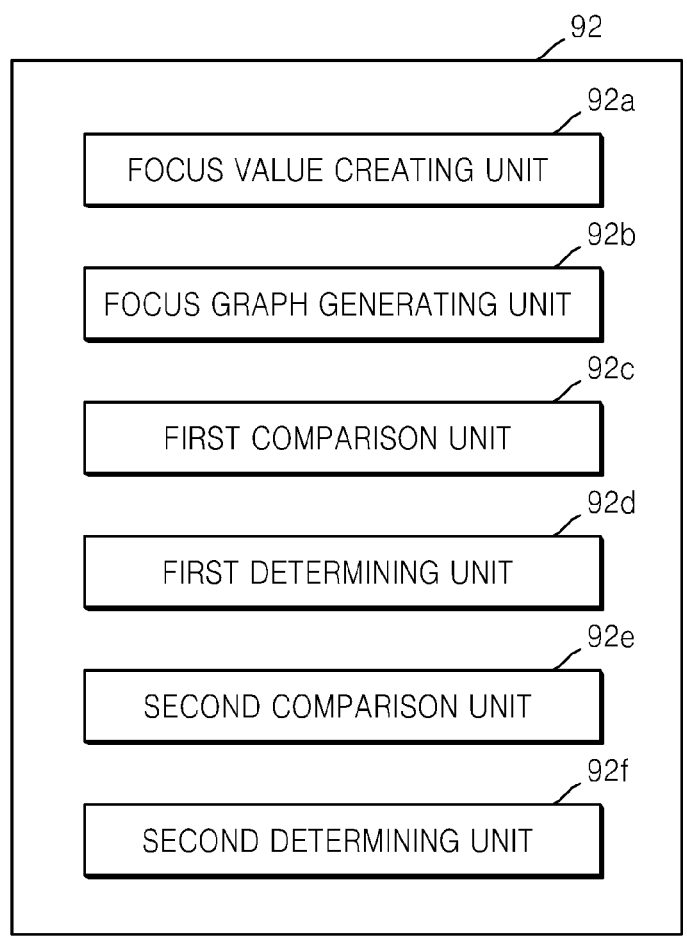
FIG. 9 is a block diagram of an AF control unit of the digital photographing apparatus of FIG. 1 according to another embodiment of the invention.

FIG. 9 is a block diagram of an AF control unit 92 according to another embodiment of the invention. Referring to FIG. 9, the AF control unit 92 includes a focus value creating unit 92a, a focus graph generating unit 92b, a first comparison unit 92c, and a first determining unit 92d, and further includes a second comparison unit 92e that determines exposure information, and a second determining unit 92f that creates a focus value of a focused image according to the exposure information. The focus value creating unit 92a, the focus graph generating unit 92b, the first comparison unit 92c, and the first determining unit 92d of the present embodiment are the same as described with reference to FIG. 2 and thus, only the second comparison unit 92e and the second determining unit 92f will be described in the present embodiment.

The focus value creating unit 92a creates a focus value of each input image according to a distance between a lens and a subject. The focus graph generating unit 92b creates a focus graph of the focus value according to the distance by normalizing the focus value. The first comparison unit 92c compares the focus graph with a point light source reference graph or a non-point light source reference graph. The first determining unit 92d creates a difference in a focus value between focus graph samples and reference graph samples, and selects a reference graph having a small difference in the focus value. If a difference between the focus graph and the non-point light source reference graph is smaller than a difference between the focus graph and the point light source reference graph, the first determining unit 92d may determine that the focus graph corresponds to the point light source reference graph. That is, the focus graph may be determined to have a similar pattern to the point light source reference graph. The first determining unit 92d may determine whether the focus graph corresponds to the point light source reference graph shown in FIG. 7 or the point light source reference graph shown in FIG. 8 by using the difference in the focus value between the reference graph and each of the point light source reference graphs shown in FIGS. 7 and 8.

If the first determining unit 92d determines that the focus graph corresponds to the point light source reference graph, the second comparison unit 92e determines exposure information of an input image and compares the exposure information with reference exposure information. If the second determining unit 92f determines the input image to have low brightness as a result of comparing the exposure information and the reference exposure information, the second determining unit 92f determines a minimum point on the focus graph as a focus value of the focused image. For example, if an exposure value of the reference exposure information is 2 brightness value (LV) and an exposure value of the exposure information of the input image is smaller than 2 LV, the second determining unit 92f determines the input image to have low brightness, and the focus graph corresponds to the point light source reference graph. Thus, the minimum point on the focus graph may be determined as the focus value of the focused image.

If the second determining unit 92f determines the input image to have high brightness as a result of comparing the exposure information and the reference exposure information, the second determining unit 92f determines that obtaining of a focus value of the focused image failed. Since a point light source image has generally low brightness, the focus graph corresponds to the point light source reference graph, whereas if the input image has high brightness, it is highly possible that the input image may not be the point light source image.

Figure 10:
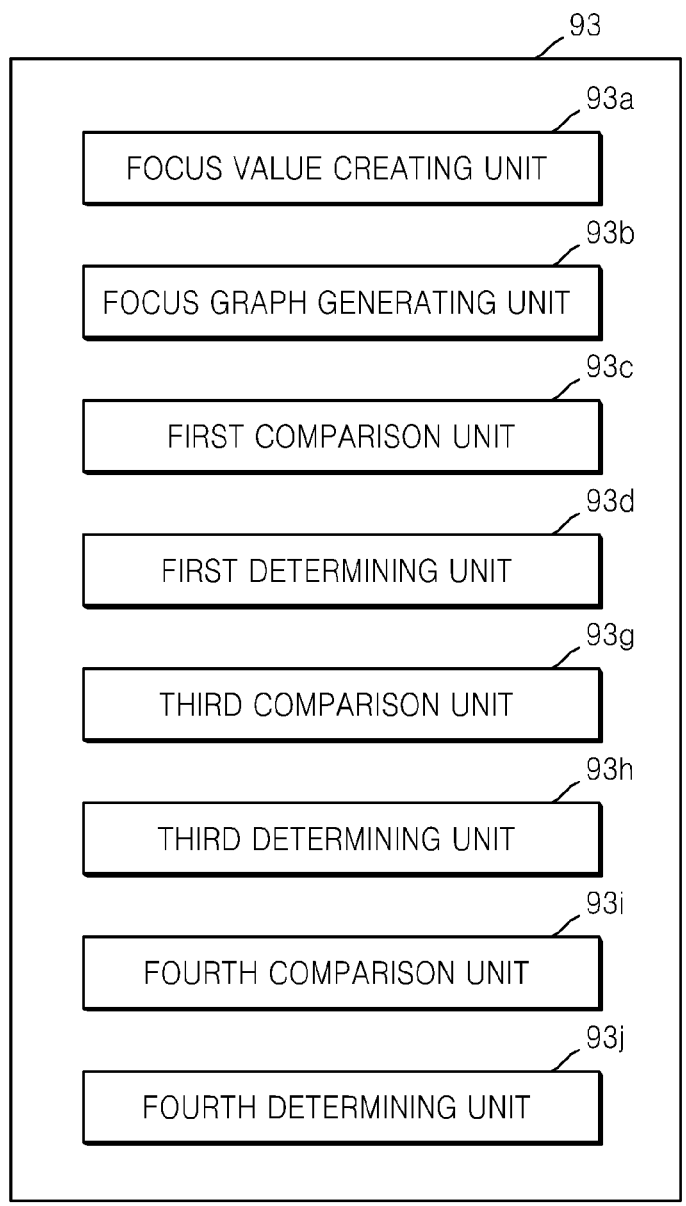
FIG. 10 is a block diagram of an AF control unit of the digital photographing apparatus of FIG. 1 according to another embodiment of the invention.

FIG. 10 is a block diagram of an AF control unit 93 according to another embodiment of the invention. Referring to FIG. 10, the AF control unit 93 includes a focus value creating unit 93a, a focus graph generating unit 93b, a first comparison unit 93c, and a first determining unit 93d, and further includes a third comparison unit 93g that compares an acutance of the focus graph with a reference acutance, and a third determining unit 93h that, if the acutance of the focus graph is smaller than the reference acutance, creates an increase or a reduction of focus values of input images according to a distance between a lens and a subject, and, if the increase or the reduction is greater than the reference acutance, determines that creation of a focus value of a focused image failed, and a fourth determining unit 93j that, if the increase or the reduction is smaller than the reference acutance, determines a maximum point on the focus graph as the focus value of the focused image. The focus value creating unit 93a, the focus graph generating unit 93b, the first comparison unit 93c, and the first determining unit 93d of the present embodiment are the same as described with reference to FIG. 2 and thus, only the third comparison unit 93g, the third determining unit 93h, the fourth comparison unit 93i, and the fourth determining unit 93j will be described in the present embodiment.

The focus value creating unit 93a creates a focus value of each input image according to the distance between the lens and the subject. The focus graph generating unit 93b generates a focus graph of the focus value according to the distance by normalizing the focus value. The first comparison unit 93c compares the focus graph with a point light source reference graph or a non-point light source reference graph. The first determining unit 93d creates a difference in a focus value between focus graph samples and reference graph samples, and selects a reference graph having a small difference in the focus value. If a difference between the focus graph and the non-point light source reference graph is smaller than a difference between the focus graph and the point light source reference graph, the first determining unit 93d may determine that the focus graph corresponds to the non-point light source reference graph. That is, the focus graph may be determined to have a similar pattern to the non-point light source reference graph. The first determining unit 93d may determine whether the focus graph corresponds to one of the non-point light source reference graphs shown in FIG. 3, 4, 5, or 6 by obtaining the difference in the focus value between the reference graph and each of the non-point light source reference graphs shown in FIGS. 3 through 6.

If the first determining unit 93d determines that the focus graph corresponds to the non-point light source reference graph, the third comparison unit 93g compares the acutance of the focus graph with the reference acutance. If the acutance of the focus graph is greater than the reference acutance, the third comparison unit 93h determines the maximum point on the focus graph as the focus value of the focused image. If the acutance of the focus graph is smaller than the reference acutance, the third comparison unit 93h determines the increase or the reduction in the focus values of the input images according to the distance between the lens and the subject. The fourth comparison unit 93i compares the increase or the reduction with a previously determined reference. If the increase or the reduction is smaller than the previously determined reference, the fourth determining unit 93j determines the maximum point on the focus graph as the focus value of the focused image. If the increase or the reduction is greater than the previously determined reference, the fourth determining unit 93j determines that creation of the focus value of the focused image failed.

Figure 11:
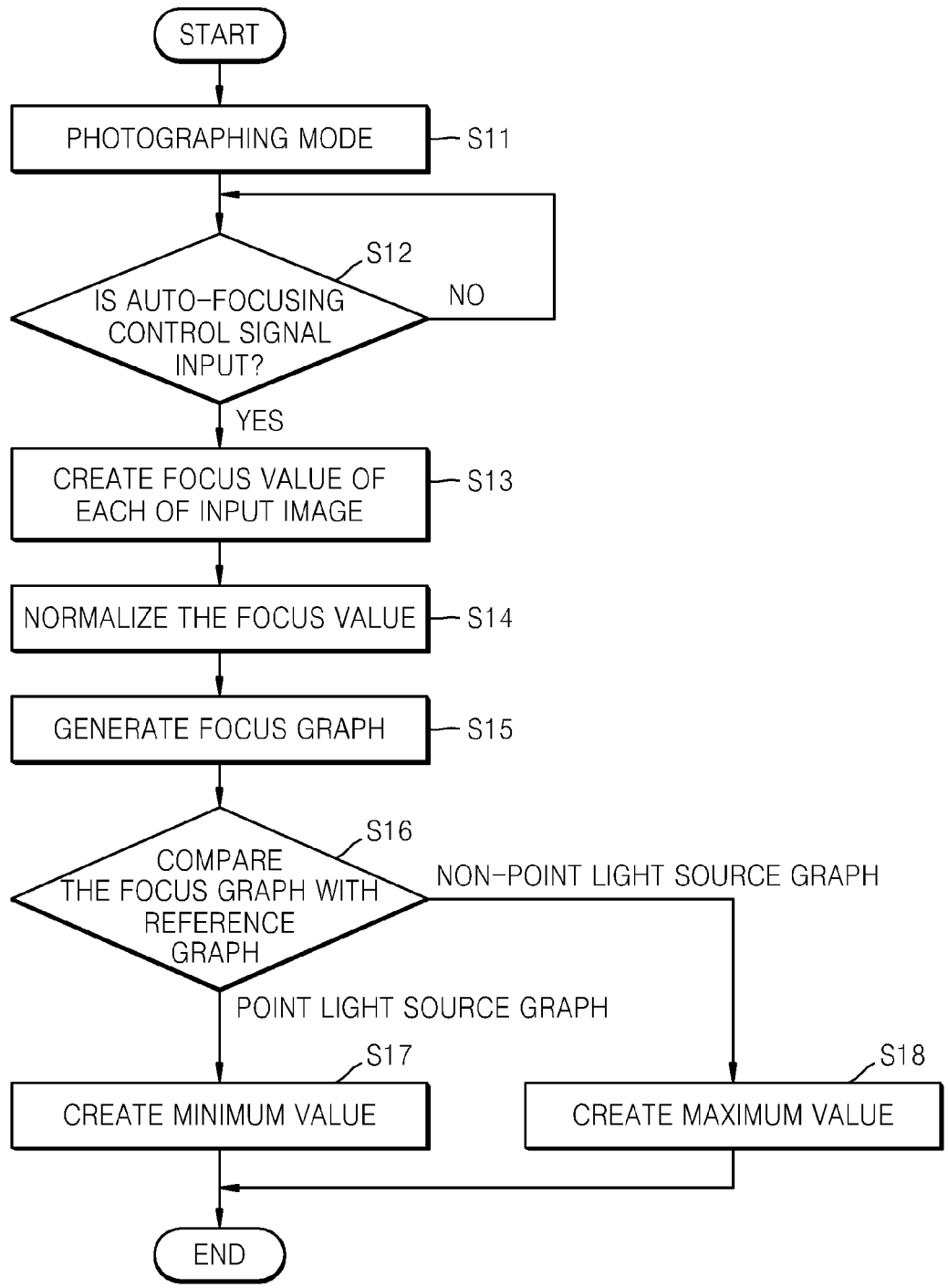
FIG. 11 is a flowchart illustrating an auto-focusing method according to an embodiment of the invention.

FIG. 11 is a flowchart illustrating an auto-focusing method according to an embodiment of the invention. Referring to FIG. 11, a photographing mode is initiated (operation 511).

It is determined whether an auto-focusing control signal is input (operation S12). For example, the digital photographing apparatus may generate a control signal to perform an auto-focusing operation, a user may input the auto-focusing control signal by pressing a shutter-release button at a position S1. If the auto-focusing control signal is not input, the photographing mode is maintained again.

If the auto-focusing control signal is input, a focus value of each input image is created (operation S13). In an embodiment, the focus value may be created with respect to an image of a unit 1 VD.

The created focus values are normalized (operation S14). Although a focus graph may be generated using the created focus values, the created focus values are normalized to generate the focus graph for convenience of operation (operation S15). Initially created focus values are used to generate the focus graph and then normalized focus values are used to generate a normalized focus graph. In this regard, a normalization method may use the equation 1.

The focus graph and a reference graph are compared to each other (operation S16). The reference graph includes a point light source reference graph and a non-point light source reference graph. The non-point light source reference graph is shown in FIGS. 3 through 6. The point light source reference graph is shown in FIGS. 7 and 8. The non-point light source reference graph shows that a subject is positioned at a far distance, at a near distance, and in a center region, whereas the point light source reference graph shows that the subject is positioned at a far distance and in a center region. A point light source image is generally captured at a far distance.

In operation S16, the focus graph and the reference graph are compared to each other by creating a difference in a focus value between focus graph samples and corresponding reference graph samples. The difference may be used to create a deviation or a standard deviation. In more detail, the deviation or the standard deviation may be created using the equations 2 and 3.

If the difference between the point light source reference graph and the focus graph is the smallest, i.e. the focus graph and the point light source reference graph have a similar pattern, a minimum point on the focus graph is created as a focus value of a focused image (operation S17). If the difference between the focus graph and the non-point light source reference graph is smaller than the difference between the focus graph and the point light source reference graph, the focus graph may be determined to correspond to the non-point light source reference graph and thus a maximum point on the focus graph may be created as the focus value of the focused image (operation S18).

Figure 12:
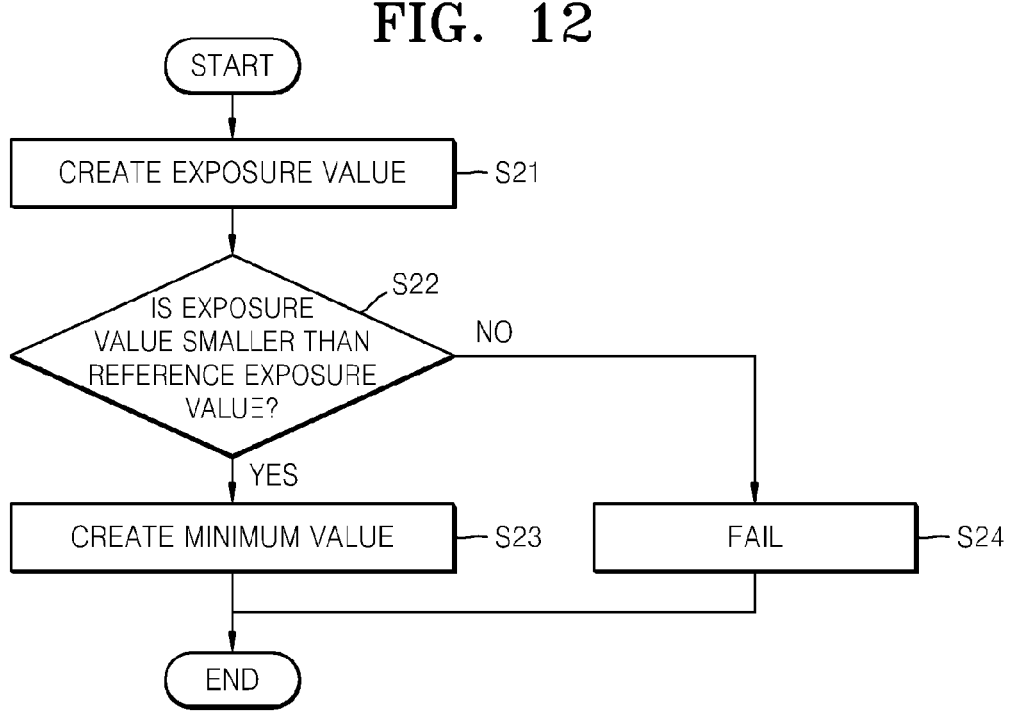
FIG. 12 is a flowchart illustrating an auto-focusing method that further includes an operation of determining exposure information if a focus graph corresponds to a point light source reference graph according to another embodiment of the invention.

FIG. 12 is a flowchart illustrating an auto-focusing method that further includes an operation of determining exposure information if a focus graph corresponds to a point-light source reference graph according to another embodiment of the invention. Referring to FIG. 12, if the focus graph corresponds to the point-light source reference graph in operation S16 of FIG. 11, before creating a minimum point on the focus graph, an exposure value is created as exposure information of an input image (operation S21). The exposure value is compared to a reference exposure value (operation S22). If the exposure value is smaller than the reference exposure value, a minimum point on the focus graph is created as a focus value of a focused image (operation S23). If the exposure value is greater than the reference exposure value, it is determined that creation of the focus value of the focused image failed (operation S24).

With respect to a point light source image, it will be described that the minimum point on the focus graph is created as the focus value of the focused image with reference to FIG. 13 that shows a point light source reference graph having a minimum point.

Figure 13:
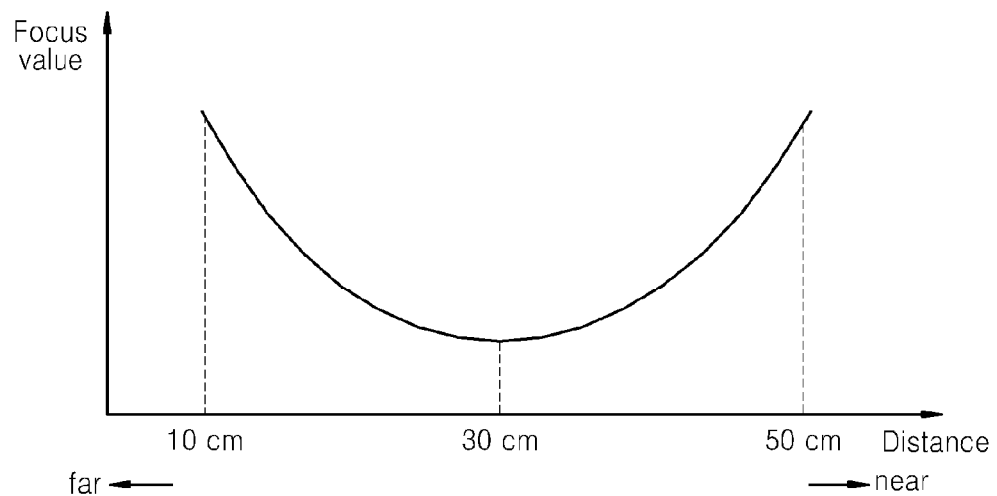
FIG. 13 is a point light source reference graph having a minimum point according to an embodiment of the invention.
Figure 13:
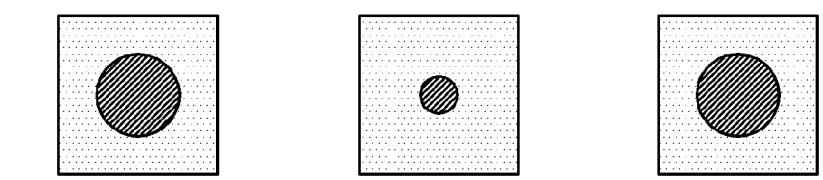

Referring to FIG. 13, a focus graph including focus values of input point light source images according to a distance between a lens and a subject shows that a point light source of a point light source image Y at the distance of 30 cm is smaller than those of point light source images X and Z at the distances of 10 cm and 50 cm. The point light source image is smaller when focused than when not focused. Thus, with respect to the point light source image, the minimum point on the focus graph is created as the focus value of the point light source image that is focused.

Figure 14:
FIG. 14 is a photo of a point light source image that is not focused.
Figure 15:
FIG. 15 is a photo of a point light source image that is focused.

FIG. 14 is a photo of a point light source image that is not focused, and FIG. 15 is a photo of a point light source image that is focused.

Figure 16:
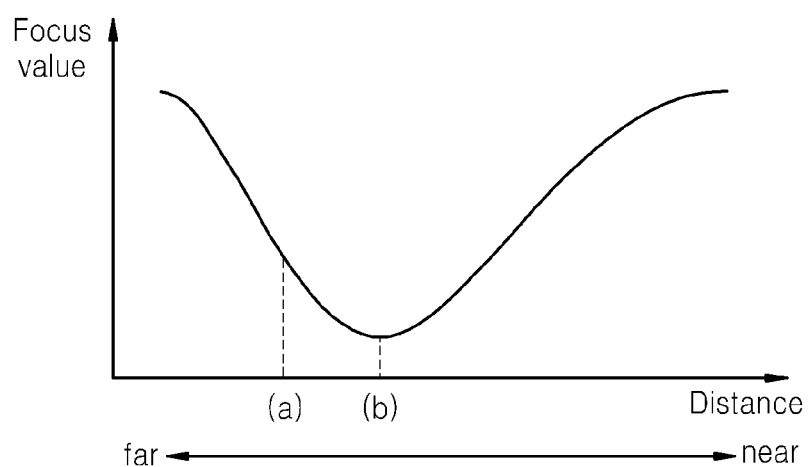
FIG. 16 is a focus graph including a focus value of the photo of FIG. 14 and a focus value of the photo of FIG. 15.

Referring to FIG. 14, light of a street lamp is blurred and thus the light looks very large. A focus value of FIG. 14 corresponds to a position (a) of a focus graph shown in FIG. 16. The focus value of FIG. 14 corresponds to a position (b) of the focus graph shown in FIG. 16. With reference to the photo of FIG. 15 and the focus graph shown in FIG. 16, the point light source image is focused.

Figure 17:
FIG. 17 is a photo captured by a digital photographing apparatus by using the auto-focusing method of FIG. 12.
Figure 18:
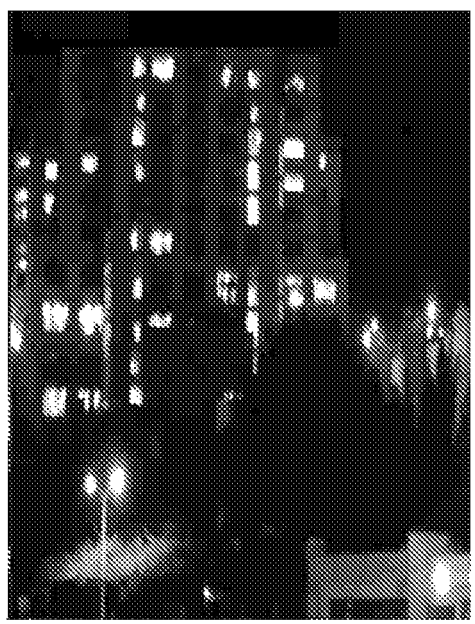
FIG. 18 is a photo captured by the digital photographing apparatus by not using the auto-focusing method of FIG. 12.

FIG. 17 is a photo captured by a digital photographing apparatus by using the auto-focusing method of FIG. 12, and FIG. 18 is a photo captured by the digital photographing apparatus by not using the auto-focusing method of FIG. 12.

Referring to FIG. 17, when a focus graph is determined to correspond to a point light source reference graph by comparing the focus graph with a reference graph, and determined to correspond to a point light source image by comparing an exposure value to a reference exposure value and determining that the exposure value is smaller than the reference exposure value, the photo is captured by creating a minimum point on the focus graph as a focus value of a focused point light source image. Meanwhile, referring to FIG. 18, the photo is captured by creating a maximum point on the focus graph as the focus value of the focused point light source image. With respect to the point light source image, since the maximum point on the focus graph is not a focus value when the point light source image is focused, the photo of FIG. 18, in which an image is not focused, may be obtained. However, according to the present embodiment, a focus value of a focused point light source image may be created using a different algorithm from that of a point light source image, thereby obtaining the focused point light source image.

Figure 19:
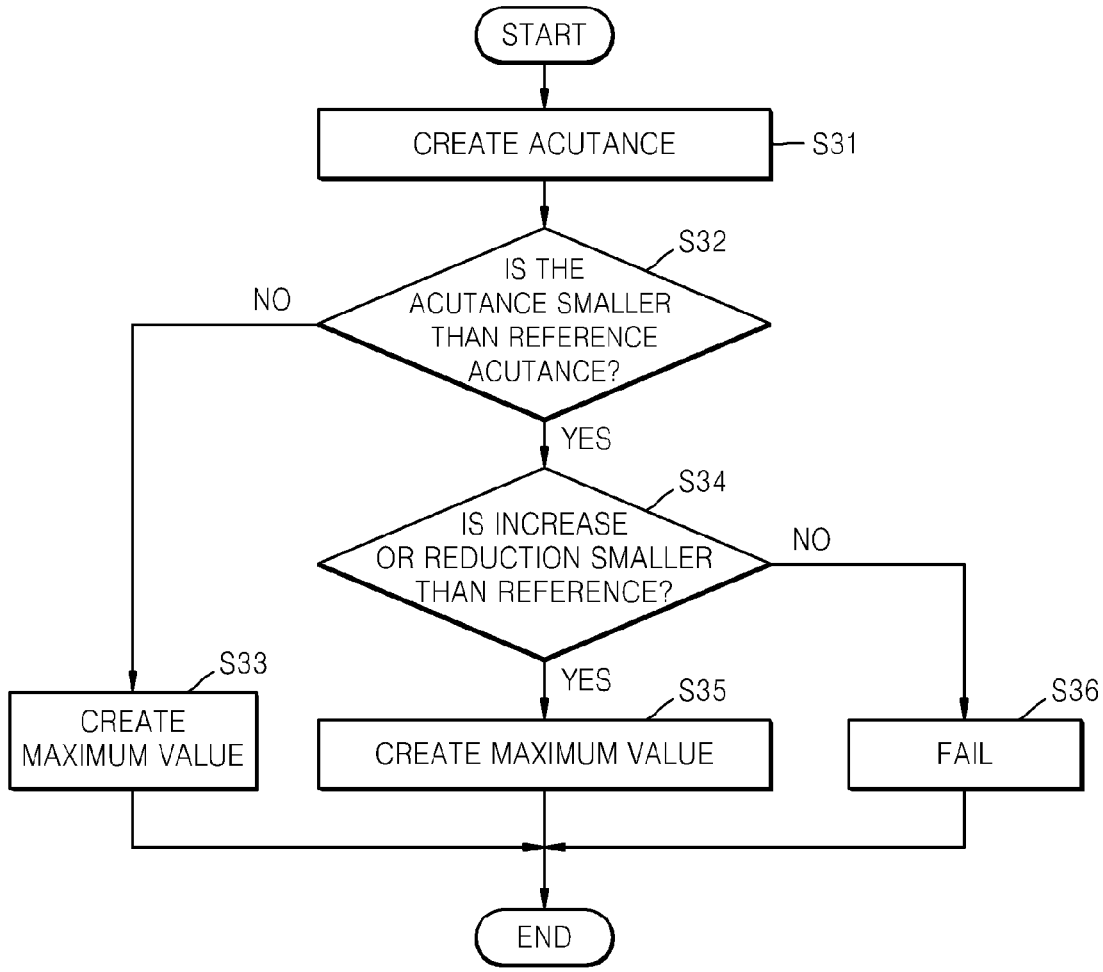
FIG. 19 is a flowchart illustrating an auto-focusing method that further includes an operation of determining an increase or a reduction in a focus value and an acutance if a focus graph corresponds to a non-point light source reference graph according to another embodiment of the invention.

FIG. 19 is a flowchart illustrating an auto-focusing method that further includes an operation of determining an increase or a reduction in a focus value and an acutance if a focus graph corresponds to a non-point light source reference graph according to another embodiment of the invention. Referring to FIG. 19, if the focus graph corresponds to the non-point light source image reference graph by comparing the focus graph with the non-point light source reference graph in operation S16 of FIG. 11, before determining that a maximum point on the focus graph is created as a focus value of a focused image, an acutance of the focus graph is determined. The acutance of the focus graph is created (operation S31), and the created acutance of the focus graph is compared to a reference acutance (operation S32). If the acutance of the focus graph is greater than the reference acutance, the maximum point on the focus graph is determined as the focus value of the focused image (operation S33). A distance between a lens and a subject corresponding to the maximum point is created, and a position of the lens corresponding to the created distance is determined, and the lens is driven, thereby obtaining a focused image. If the acutance of the focus graph is smaller than the reference acutance, an increase or a reduction in focus values of input images according to the distance is determined, and the increase or the reduction is compared to a previously determined reference (operation S34). If the increase or the reduction is smaller than the previously determined reference, the maximum point on the focus graph is determined as the focus value of the focused image (operation S35). Alternatively, if the increase or the reduction is greater than the previously determined reference, it is determined that creation of the focus value of the focused image failed (operation S36).

Figure 20:
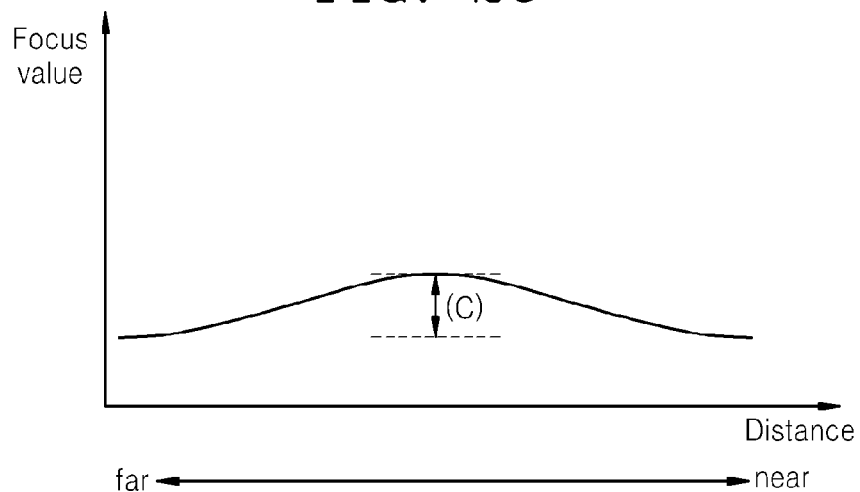
FIG. 20 is a focus graph showing an acutance.

FIG. 20 is a focus graph showing an acutance c. In this regard, the acutance c is a ratio of a maximum focus value calculated during an auto-focusing operation and a minimum focus value.

Figure 21:
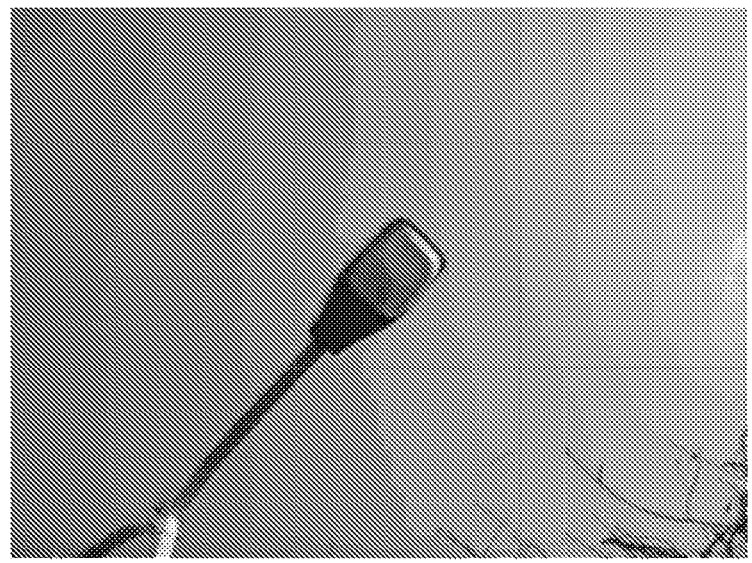
FIG. 21 is a photo captured by a digital photographing apparatus by not using the auto-focusing method of FIG. 19.
Figure 22:
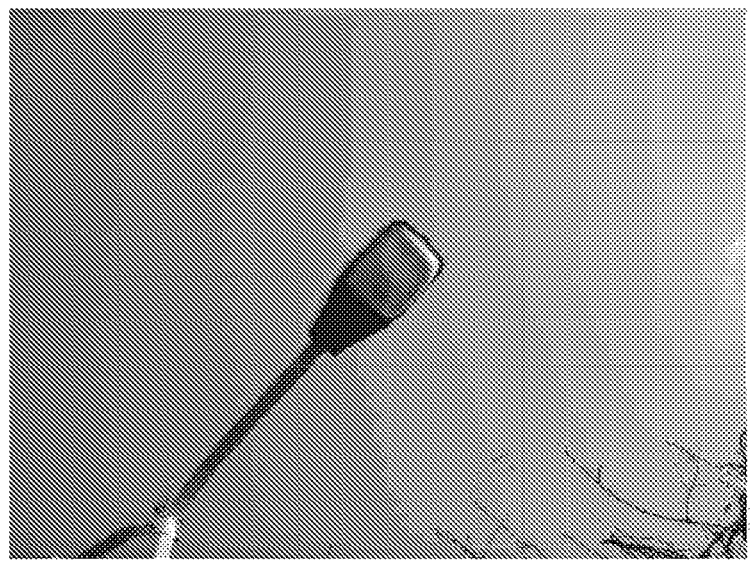
FIG. 22 is a photo captured by the digital photographing apparatus by using the auto-focusing method of FIG. 19.

FIG. 21 is a photo captured by a digital photographing apparatus by not using the auto-focusing method of FIG. 19, and FIG. 22 is a photo captured by the digital photographing apparatus by using the auto-focusing method of FIG. 19.

Although a maximum point on a focus graph can be created as a focus value of a focused image since an image is a non-point light source image, since the non-point light source image has a low contrast and accordingly has insufficient edge information, it is difficult to obtain an accurate focus value due to a lack of data reliability with respect to a focus value. Thus, although the focus graph corresponds to the non-point light source reference graph, it is possible to prevent an inaccurate focus value (a focus value when the image is focused) with respect to an image having a low contrast from being created by additionally determining the acutance of the focus graph and the increase or the reduction in focus values of input images.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the invention can be easily construed by programmers of ordinary skill in the art to which the invention pertains.

An embodiment of the invention provides a method of determining whether an input image is a point light source image or a non-point light source image and creating a focus value of a focused point light source image or a focused non-point light source image by using different methods. In more detail, a point light source reference graph and a non-point light source reference graph are previously stored in a database. If a focus graph of the input image corresponds to the point light source reference graph, a minimum point on the focus graph is created as a focus value of a focused image, and, if the focus graph corresponds to the non-point light source reference graph, a maximum point on the focus graph is created as a focus value of a focused image.

Furthermore, if the focus graph corresponds to the point light source graph, brightness information of the input image is determined, and if the input image has low brightness, the minimum point on the focus value is determined as a focus value of a focused image. If the input image has high brightness, it is determined that creation of the focus value failed. Thus, the focus value may be created when the point light source image is more accurately focused.

In addition, if the focus graph corresponds to the non-point light source graph, an acutance of the focus graph and an increase or a reduction in the focus graph are determined. Although the acutance of the focus graph may be low or high, if the increase or the reduction is low, the maximum point on the focus graph is created as the focus value of a focused image. If the acutance of the focus graph is low and the increase or the reduction is high, it is determined that creation of the focus value failed. Thus, a focus value is created only when an image having a low contrast is more accurately focused.

Therefore, the invention increases reliability of an auto-focusing function with respect to various input images, thereby increasing user satisfaction.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

While various embodiments of the invention are described in terms of functional block components, such functional blocks may be realized by any number of hardware and/or software components configured to perform the specified functions. For example, embodiments of the invention may employ various integrated circuit components, processing elements, logic elements, etc.

The particular implementations shown and described herein are illustrative examples of the invention and are not intended to otherwise limit the scope of the invention in any way. The connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. An auto-focusing method comprising:
creating focus values for an image, each focus value corresponding to a distance between a lens and a subject, and generating a focus graph of the focus values;
comparing the focus graph with at least one of a point light source reference graph and a non-point light source reference graph;
determining whether the focus graph corresponds to a point light source reference graph or a non-point light source reference graph based on comparison result;
if the focus graph corresponds to the point light source reference graph, determining a minimum point on the focus graph as a focus value of a focused image; and
if the focus graph corresponds to the non-point light source reference graph, determining a maximum point on the focus graph as the focus value of the focused image.

2. The method of claim 1, further comprising:
normalizing the focus values,
wherein the focus graph is generated according to the normalized focus values.

3. The method of claim 1, wherein the comparing of the focus graph comprises creating a difference between a sample of the focus graph and a sample of one of the point light source reference graph and the non-point light source reference graph.

4. The method of claim 1, wherein the point light source reference graph has a minimum point, and the non-point light source reference graph has a maximum point.

5. The method of claim 1, wherein, if the focus graph corresponds to the point light source reference graph,
creating exposure information about the image;
comparing the exposure information with reference exposure information; and
if the image has low brightness, determining the minimum point on the focus graph as the focus value of the focused image.

6. The method of claim 1, wherein, if the focus graph corresponds to the non-point light source reference graph,
creating an acutance of the focus graph;
comparing the acutance of the focus graph with a reference acutance; and
if the acutance of the focus graph is greater than the reference acutance, determining the maximum point on the focus graph as the focus value of the focused image, and, if the acutance of the focus graph is smaller than the reference acutance, comparing one of an increase and a reduction in the focus values of the image with a reference; and
if the one of the increase and the reduction in the focus values is smaller than the reference, determining the maximum point on the focus graph as the focus value of the focused image.

7. A recording medium having recorded thereon the auto-focusing method of claim 1.

8. The method of claim 3, wherein the difference is one of a deviation and a standard deviation of the samples.

9. The method of claim 3, wherein
the focus graph is determined to correspond to the point light source reference graph, if the difference between the sample of the focus graph and the sample of the point light source reference graph is smaller than the difference between the sample of the focus graph and the sample of the non-point light source reference graph, and
the focus graph is determined to correspond to the non-point light source reference graph, if the difference between the sample of the focus graph and the sample of the non-point light source reference graph is smaller than the difference between the sample of the focus graph and the sample of the point light source reference graph.

10. The method of claim 5, further comprising: if the image has high brightness, determining that creation of the focus value of the focused image failed.

11. The method of claim 6, further comprising: if the one of the increase and the reduction in the focus values is greater than the reference, determining that creation of the focus value of the focused image failed.

12. An auto-focusing apparatus comprising:
a focus value creating unit for creating focus values for an image, each focus value corresponding to a distance between a lens and a subject;
a focus graph generating unit for generating a focus graph of the focus values;
a first comparison unit for comparing the focus graph with at least one of a point light source reference graph and a non-point light source reference graph;
a first determining unit for determining whether the focus graph corresponds to a point light source reference graph or a non-point light source reference graph based on comparison result and,
if the focus graph corresponds to the point light source reference graph, determining a minimum point on the focus graph as a focus value of a focused image, and
if the focus graph corresponds to the non-point light source reference graph, determining a maximum point on the focus graph as the focus value of the focused image.

13. The apparatus of claim 12, wherein the focus graph generating unit normalizes the focus values, and generates the focus graph according to the normalized focus values.

14. The apparatus of claim 12, wherein the point light source reference graph has a minimum point, and the non-point light source reference graph has a maximum point.

15. The apparatus of claim 12, further comprising: if the first determining unit determines that the focus graph corresponds to the point light source reference graph,
a second comparison unit for comparing exposure information about the image with reference exposure information; and
a second determining unit for, if the input image has low brightness, determining the minimum point on the focus graph as the focus value of the focused image, and if the input image has high brightness, determining that creation of the focus value of the focused image failed.

16. The apparatus of claim 12, further comprising: if the first determining unit determines that the focus graph corresponds to the non-point light source reference graph,
a third comparison unit for creating an acutance of the focus graph;
a third determining unit for, if the acutance of the focus graph is greater than a reference acutance, determining the maximum point on the focus graph as the focus value of the focused image, and, if the acutance of the focus graph is smaller than the reference acutance, comparing one of an increase and a reduction in the focus values of the image with a reference;
a fourth comparison unit for comparing the one of the increase and the reduction in the focus values with a reference; and
a fourth determining unit for, if the one of the increase and the reduction is smaller than the reference, determining the maximum point on the focus graph as the focus value of the focused image, and if the one of the increase and the reduction is greater than the reference, determining that creation of the focus value of the focused image failed.

17. The apparatus of claim 13, wherein the first comparison unit creates a difference between a sample of the focus graph and a sample of one of the point light source reference graph and the non-point light source reference graph.

18. The apparatus of claim 17, wherein the difference is one of a deviation and a standard deviation of the samples.

19. The apparatus of claim 17, wherein
the first determining unit determines that the focus graph corresponds to the point light source reference graph, if the difference between the sample of the focus graph and the sample of the point light source reference graph is smaller than the difference between the sample of the focus graph and the sample of the non-point light source reference graph, and
the first determining unit determines that the focus graph corresponds to the non-point light source reference graph, if the difference between the sample of the focus graph and the sample of the non-point light source reference graph is smaller than the difference between the sample of the focus graph and the sample of the point light source reference graph.

20. A method for focusing an image comprising:
creating a focus graph based on focus values for the image, each focus value corresponding to a distance between a lens and a subject;
comparing the focus graph to at least one of a point light source reference graph and a non-point light source reference graph and determining whether the focus graph corresponds to a point light source reference graph and,
determining whether the focus graph corresponds to a point light source reference graph or a non-point light source reference graph based on comparison result;
focusing the image based on a minimum point of the focus graph if the focus graph corresponds to the point light source reference graph; and
focusing the image based on the maximum point of the focus graph if the focus graph corresponds to the non-point light source reference graph.

21. An auto-focusing method comprising:
creating focus values for an image, each focus value corresponding to a distance between a lens and a subject, and generating a focus graph of the focus values;
comparing the focus graph with at least one of a point light source reference graph and a non-point light source reference graph by creating a difference between a sample of the focus graph and a sample of one of the point light source reference graph and the non-point light source reference graph;
if the focus graph corresponds to the point light source reference graph, determining a minimum point on the focus graph as a focus value of a focused image; and
if the focus graph corresponds to the non-point light source reference graph, determining a maximum point on the focus graph as the focus value of the focused image.

22. An auto-focusing apparatus comprising:
a focus value creating unit for creating focus values for an image, each focus value corresponding to a distance between a lens and a subject, and generating a focus graph of the focus values;
a focus graph generating unit for comparing the focus graph with at least one of a point light source reference graph having a minimum point and a non-point light source reference graph having a maximum point;
a first comparison unit for, if the focus graph corresponds to the point light source reference graph, determining a minimum point on the focus graph as a focus value of a focused image; and
a first determining unit for, if the focus graph corresponds to the non-point light source reference graph, determining a maximum point on the focus graph as the focus value of the focused image.

* * * * *